May 24, 1932.          C. B. BUERGER          1,859,378
LIQUID COOLED STUFFING BOX
Filed Nov. 30, 1928
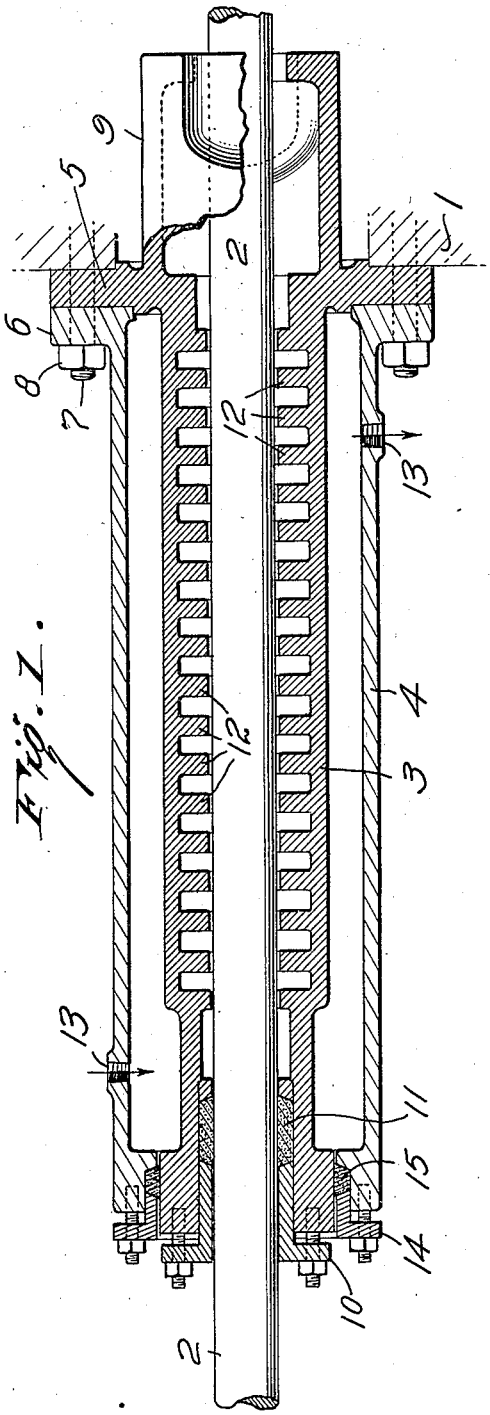
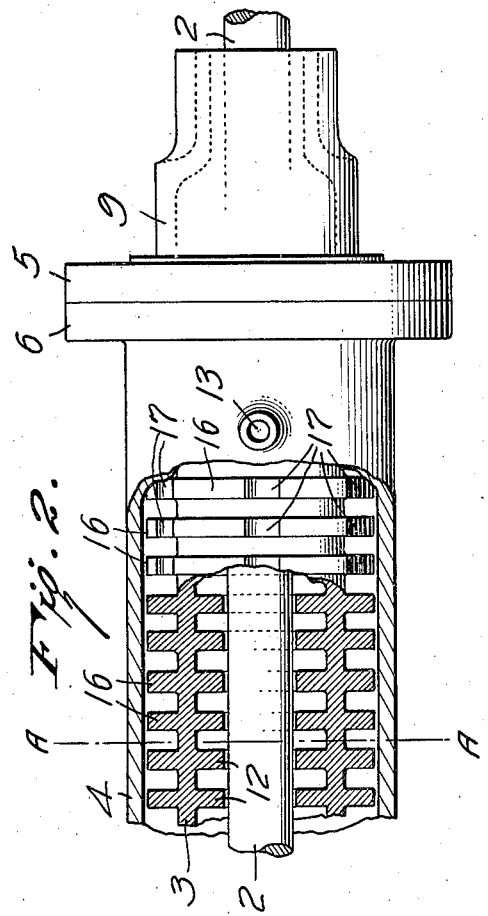
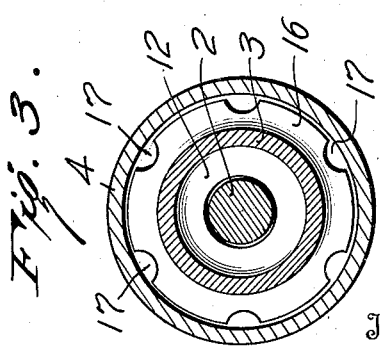
Inventor
CHARLES B. BUERGER,
By K. P. McElroy
Attorney Patented May 24, 1932

1,859,378

UNITED STATES PATENT OFFICE

CHARLES B. BUERGER, OF PITTSBURGH, PENNSYLVANIA, ASSIGNOR TO GULF REFINING COMPANY, OF PITTSBURGH, PENNSYLVANIA, A CORPORATION OF TEXAS

LIQUID COOLED STUFFING BOX

Application filed November 30, 1928. Serial No. 322,924.

This invention relates to liquid cooled stuffing boxes and more particularly to a stuffing box for hot oil pumps, and it comprises, in combination with a pump cylinder and reciprocating pump shaft, a double walled cooling jacket extending outward from the end of the pump cylinder and surrounding the pump shaft, and adapted to confine between its walls a cooling fluid, and having fins extending from its inner wall adjacent the reciprocating pump rod in such manner as to preclude the circulation lengthwise of the jacket of any substantial amount of the liquid being pumped and to confine cooled liquid between the fins in contact with the shaft to assist in the dissipation of the heat of the shaft; a stuffing box at the end of the cooling jacket more remote from the pump cylinder adapted with the aid of a gland to hold packing between the reciprocating rod and the inner wall of the cooling jacket to preclude passage therebeyond of the liquid being pumped, and a second stuffing box with gland at the end of the cooling jacket more remote from the pump cylinder, adapted to seal the space between the inner wall and the outer wall of said cooling jacket while permitting slidable motion between these two walls to compensate for differences in expansion.

The maintenance of a tight packing in the stuffing box of a pump cylinder handling very hot liquids has always been a serious problem. Those packing materials which have sufficient resilience and "give" to accommodate themselves to the inequalities incident to a packed reciprocating rod are not of such a nature as can stand high temperature. Burning and seizing invariably occur after a very short period. The softer and ordinarily more desirable metallic packings will melt at the temperatures of many hot liquids which it is desirable to pump. Such temperatures also soon take the spring out of the expansive and contractive elements of that type of packing which is made of iron. Lubrication of any of these types of packing is impossible over an extended period whenever the temperatures are very high. These difficulties may well be appreciated by considering the hot oil pumps in a petroleum cracking system, which pumps handle flammable liquid under pressure of many hundreds of pounds per square inch and at temperatures of from 800° F. to 1200° F. In such a case the destructive action of the heat on the packing is accompanied by strong chemical attack of some of the constituents being pumped on that portion of the rod which passes through the packing, and which chemical attack is much more serious when the temperature of the material is high.

The foregoing has pointed out the great mechanical difficulties attendant upon the pumping of hot liquid, but even more important is the fact that that difficulty is oftimes accompanied by danger. Once a leak develops through the packing it is very common for the entire packing to be destroyed in a remarkably short time and in the very common case of pumping highly heated flammable liquid there will be a discharge of a considerable stream of flaming fluid. In such a situation the only thing to do is to shut down the system, and again the sudden shutting down of a manufacturing process handling flammable fluids at high temperature and high pressure may entail other serious consequences to highly expensive equipment and even to the lives of the attendant operators.

Since there is no great difficulty in keeping a cool rod securely packed and since the chemical action of liquids being pumped upon the pump rod is much less at low temperature, a large part of the difficulty hereinbefore described can be eliminated by providing some means of maintaining that portion of the pump rod which passes through the packing at a temperature much below that of the material being pumped. This purpose I have accomplished with great success by means of the apparatus herein described and illustrated.

In the accompanying drawings showing the specific embodiments of my invention:

Figure 1 is a longitudinal section of my cooling jacket and stuffing box;

Figure 2 is a segmental view partly in longitudinal section and partly in perspective showing a modified form of the invention;

Figure 3 is a section along line A—A of Figure 2.

Referring to the drawings:

The end of the pump cylinder through which the reciprocating rod passes to a source of power is indicated by reference numeral 1, and the reciprocating rod by reference numeral 2. The inner wall of the cooling jacket is indicated by 3 and the outer wall of the cooling jacket by 4. The inner wall of the cooling jacket has a flange 5 at the pump end and the outer wall of the cooling jacket has a flange 6 at the same end. These two jackets are fastened one to another and to the pump cylinder head by the machine screws 7 and nuts 8. The pump end of the inner wall 3 of the cooling jacket carries a small auxiliary chamber 9 which may extend slightly inside of the pump cylinder. On the opposite end of the inner wall of the cooling jacket is a stuffing box in which a gland 10 holds packing 11. The cooling jacket may advantageously be of such length that the distance between the auxiliary chamber 9 and the packing 11 is not substantially less than the length of stroke of the pump rod. That portion of the inner wall 3 of the cooling jacket which connects the auxiliary chamber 9 with the stuffing box at the opposite end carries a series of radiating fins 12 extending inwardly and almost contacting with the rod 2. The outer wall of the cooling jacket 4 has openings 13 to permit of the introduction and circulation of a fluid cooling medium and at the end of wall 4 more remote from the pump cylinder is a second stuffing box in which the gland 14 holds packing 15 to seal off this joint against the passage of cooling liquid therebeyond. The glands are tightened up against the packing by any of the various common means and the drawings depict machine screws and nuts for the purpose.

A modification of my invention illustrated in Figure 2 is identical with that described in Figure 1 except that the inner wall 3 carries fins 16 in addition to the previously described fins 12 and these fins 16 aid dissipation of the heat absorbed by the fins 12 into the cooling medium which fills the annular space between the walls 3 and 4. Rather than make the fins 16 unduly short or make the outer wall 4 of unduly large diameter in order to allow space for the passage of a cooling medium between the fins 16 and the walls 4 it is sometimes desirable to make the fins 16 of a shape illustrated in Figures 2 and 3. These views show the fins 16 with circular segments 17 cut out of their periphery.

To prevent confusion in referring to the two walls of the double walled jacket surrounding the pump rod and to emphasize their functions we might refer to the inner wall 3 and to the outer wall 4 respectively as the heat conducting wall and the enclosing wall.

This device is designed to conduct away the heat of the pump rod with the aid of a liquid cooling medium and so it is necessary that the space between the inner and outer jacket be well supplied at all times with a cooling liquid. A circulation of cooling fluid must always be maintained through the space between the inner and outer wall and the term "circulation" is here used in the sense of including any constant or intermittent introduction of cooling fluid regardless of whether the so introduced material leaves the totally enclosed space in liquid or vapor form.

As previously mentioned the fins serve a double purpose in that they form means for conducting the heat of the rod away to the cooling fluid and in that they extend close up to, but not against, the rod itself and confine between one another annular shaped bodies of liquid at temperatures much below that of the material being pumped. These annular shaped bodies of liquid wet the rod and, being in such close relation thereto, are able to absorb and convey heat units away from said rod to the adjacent fins and heat conducting wall in a remarkably effective manner. With the fins in such relation to the rod as I have described there is a relatively small interchange of liquid between these chambers and the pump cylinder. This cooled liquid from the annular spaces between the fins is carried up toward the packing 11 at each outward stroke of the rod 2, thereby providing a good lubrication for the movement of the rod through the packing. The addition of fins to the opposite face of the heat conducting wall will also assist in the dissipation of the heat from the hot rod to the cooling medium and these fins may be either radial fins or longitudinal fins. The cooling efficiency of the circulated cooling medium may be improved somewhat by placing a helical shaped piece within the space between the heat conducting wall and the enclosing wall. Such a piece not only improves the rate of heat transfer by increasing the velocity of the cooling medium over the surface to be cooled, but gives a slightly lower average temperature of the circulated cooling medium at the stuffing box end.

While my invention has been described and illustrated as applied to the liquid end of a reciprocating pump it will obviously be equally effective for cooling a rod coming from a cylinder in which highly superheated steam is used or for cooling a rotating shaft which normally operates at high temperature and which must be kept packed.

The term "pump cylinder" has here been used to describe any displacement cylinder or chamber surrounding an impeller in which a fluid is subjected to a force intended to propel it to another point.

Under some circumstances it might be desirable to use a vapor or gas, rather than a liquid, as the cooling medium, and such is within the purview of my invention.

What I claim is:

1. The combination with a pump having a pump cylinder and a reciprocating pump shaft of a jacket extending outwardly from the pump cylinder head and surrounding the pump shaft and spaced away therefrom and carrying at its outer end a stuffing box adapted to prevent the passage therebeyond of fluid from the pump cylinder, a series of fins extending inwardly from said jacket toward the pump shaft and forming a series of annular pockets surrounding the pump shaft, said series of fins being situated between the stuffing box and the pump cylinder head; a second jacket enclosing the first and spaced away therefrom and carrying a second stuffing box at its outer end adapted to seal off the space between the two jackets while permitting sliding motion between their ends; and means for introduction of a cooling medium into the space between the two jackets and means for discharge of said cooling medium therefrom.

2. In combination with a pump having a pump cylinder and a reciprocating pump shaft, two enclosing jackets spaced radially from the pump shaft and from one another and extending outwardly from the pump cylinder head, a stuffing box positioned on the outer end of the inner of the two enclosing jackets and adapted to seal the space between the pump shaft and the inner of the two jackets and prevent the passage therebeyond of any of the liquid being pumped; a sealing means between the outer ends of the two jackets; a series of fins protruding from the inner of the two jackets toward the pump shaft but not in frictional contact therewith, resulting in the formation between adjacent fins of annular shaped pockets; and means for introduction of a cooling fluid into the space between the two jackets and means for discharge of said cooling fluid therefrom.

3. The combination with a pump having a pump cylinder and a reciprocating pump shaft passing through a stuffing box of a double walled cooling device surrounding the pump shaft and interposed between the head of the pump cylinder and the shaft stuffing box and carrying on its inner wall a series of fins extending inwardly toward the pump shaft, but not in substantial frictional contact therewith, said series of fins in conjunction with the cooling jacket and the shaft forming a series of annular pockets; means for introducing and circulating a cooling fluid between the walls of said cooling device and removing it therefrom; and means of compensating for differences of contraction and expansion between the two walls of said cooling device.

4. The combination with a pump having a pump cylinder and a reciprocating pump shaft of a jacket extending outwardly from the pump cylinder head and surrounding the pump shaft and spaced away therefrom, said jacket having a length not substantially less than the length of stroke of the reciprocating pump shaft; a stuffing box at the outer extremity of said jacket; a gland and packing in said stuffing box to prevent the passage therebeyond of fluid from the pump cylinder; a series of fins on the inner face of said jacket between said stuffing box and said pump cylinder head and extending inwardly to the pump shaft but not in substantial frictional contact therewith; a second jacket surrounding the first jacket and spaced away therefrom and a second stuffing box at the outer extremity of the second jacket; a gland and packing in said second stuffing box to seal off the space between the first jacket and the second jacket and form a totally enclosed space therebetween; an inlet for cooling fluid through the second jacket near one end into the said totally enclosed space, and an outlet for cooling fluid through the second jacket at its opposite end.

In testimony whereof, I have hereunto affixed my signature.

CHARLES B. BUERGER.